2,528,226

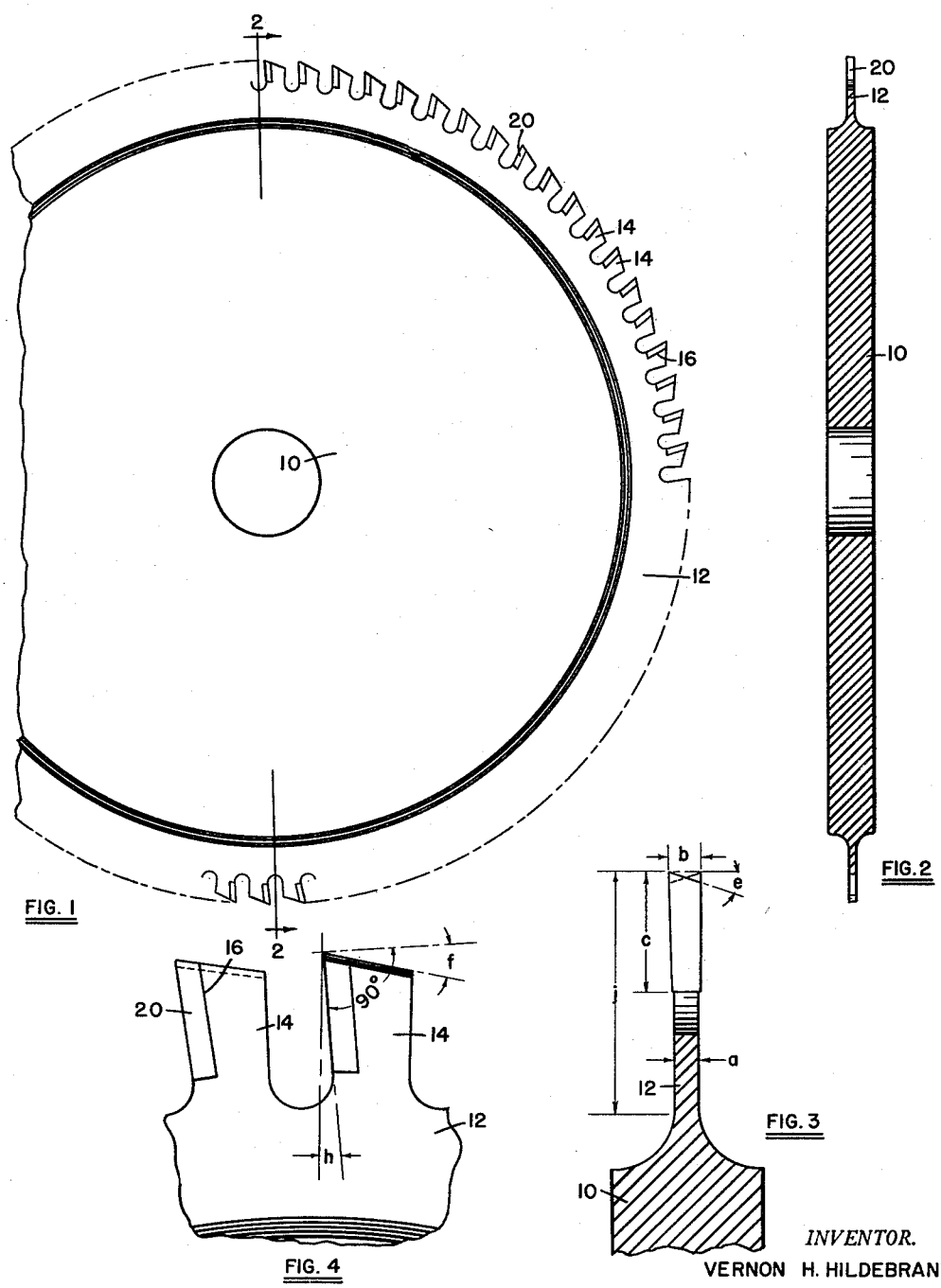
Oct. 31, 1950     V. H. HILDEBRANT     2,528,226
CIRCULAR SAW AND METHOD OF MAKING SAME
Filed Jan. 21, 1949
INVENTOR.
VERNON H. HILDEBRANT Patented Oct. 31, 1950

UNITED STATES PATENT OFFICE 2,528,226

CIRCULAR SAW AND METHOD OF MAKING SAME

Vernon H. Hildebrant, Morrow, Ohio, assignor to Walter H. Geier, Cincinnati, Ohio Application January 21, 1949, Serial No. 71,908

7 Claims. (Cl. 143—133)

This invention relates to circular saws, and more particularly to the method of fabricating saws for providing a thin, well defined cut in wood, plastics, and non-ferrous metals.

An object of the present invention is to provide a circular saw the teeth of which are provided with tips of hard material, such as tungsten carbide, and wherein the width of cut is considerably narrower than has heretofore been possible with such cutting tools.

Another object of the invention is to provide a circular saw having a massive body portion from which a narrow cutting fin extends, and wherein said fin and body are formed integrally from a single piece of material.

A further object of the invention is to provide a circular saw having a massive body portion and a comparatively thin radially extending cutting fin which is so constructed and arranged whereby to provide a true clean cut free of run out and wherein all teeth of the saw work equally thereby greatly increasing the life of the saw.

Still a further object of the invention is to provide a circular saw having a massive body portion from which a thin cutting fin extends radially, and wherein the teeth provided in said fin are tipped with hardened cutting elements brazed or otherwise permanently secured in place without distorting or warping the fin and body.

Another object of the invention is to teach a method of fabricating a saw having the hereinabove described characteristics, and of eliminating or appreciably lessening distortion of the body and fin during the heat treating process.

A further object of the invention is to teach a method of fabricating a circular saw wherein tensioning of the saw blade may be dispensed with.

Still a further object of the invention is to provide a circular saw which is so constructed and arranged as to operate at high peripheral speeds and wherein the cuts made by the saw are free of disfiguring, unwanted tooth marks, or grooves. The edges of the cuts made by my saw are given a polished finish, thereby eliminating the need for further conditioning or treatment of the edges.

Another object of the invention is to provide a circular saw having universal characteristics in the sense that it does not require tensioning for different speeds of operation.

A further object of the invention is to provide a saw having the hereinabove described characteristics which is characterized by a fly-wheel effect during operation and which has a life many, many times greater than circular saws presently on the market.

Still a further object of the invention is to provide a circular saw having a massive body portion and a narrow cutting edge extending radially therefrom which effectively resists distortion incident to grinding operations.

Still another object of the invention is to provide a circular saw having the hereinabove described characteristics which enables cuts, as narrow as .040 of an inch, to be made in material such as compressed impregnated wood, plastics and non-ferrous metals, thereby effecting material savings up to 50% over present-day circular saws.

These and other objects are attained by the means described herein and as disclosed in the accompanying drawings, in which:

Fig. 1 is a partial front elevational view of a circular saw embodying my invention.

Fig. 2 is a sectional view taken on line 2—2 of Fig. 1.

Fig. 3 is an enlarged view of the upper end of Fig. 2.

Fig. 4 is an enlarged fragmental view of two teeth of the saw of Fig. 1.

With reference now to Figs. 1 and 2, it will be noted that the saw comprises a body portion 10 from which a narrow radially projecting fin 12 projects, said fin and body being integral. If desired, the body and fin may be turned from a piece of steel after which a plurality of teeth, denoted generally by the numerals 14 may be provided. Each tooth may be provided with an undercut tooth-tip receptive portion, notch or socket 16.

The blank thus formed may then be heat treated for imparting the desired characteristics to the body and fin.

After the heat treating operation has been completed, the body and fin portions may be ground to desired dimensions.

In those instances where it is desired to provide a cut as narrow as .0625 of an inch, I have found that the width or thickness dimension of fin 12 may be .050 of an inch, and for a 12-inch saw, the thickness of body portion 10 may be .375 of an inch.

After the blank has thus been accurately ground and trued, hardened tips, denoted generally by the numerals 20 may be permanently secured to each tooth, such as by means of hydrogen brazing, or the like, it being understood that each tip will be seated within a complementary socket or notch portion 16 provided in the leading edge of the teeth. The tips may thus be permanently secured to their respective teeth without distorting or warping fin 12 since the heat of brazing is rapidly transferred to the adjacent portions of body 10. This heat dissipation is so pronounced that the body portion adjacent a tooth to which a tip is being brazed does not become heated above temperatures uncomfortable to touch.

After tips 20 have thus been permanently attached to their respective teeth, they may be cleaned up by a grinding operation after which they may be sharpened and ground, and the saw is then ready for use.

With particular reference now to Fig. 3, it will be observed that dimension $a$ may be .050 in those instances when dimension $b$ is .0625, and the length dimension $c$ of each tip may approximate .25 of an inch.

In order to provide a clean cutting effect, the angle denoted by the numeral $e$ may approximate 20 degrees, it being understood that the slope of adjacent teeth will be in opposite directions, see Fig. 3.

With reference now to Fig. 4, it will be observed that highly satisfactory results are obtained when angle $f$ approximates 15 degrees. In those instances where the material to be sawed is high density laminated synethetic resin impregnated wood or compressed impregnated wood, plastics or non-ferrous metals, the radial hook angle $h$ may be 5 degrees, when wood or plywood is being cut this angle may be 15 degrees for a cross-cut saw and approximately 30 degrees for a rip saw.

At the present time, I have found that excellent results have been obtained in those instances when tip width $b$ is .125 inch, dimension $a$ may be .090. When the tip width exceeds .125 inch, dimension $a$ may preferably be .040 inch less than $b$, thereby providing proper and desired clearance.

In the preferred embodiment of the invention, the overall effective length of fin 12, that is, dimension $j$, Fig. 3, should equal the thickness of stock to be sawed plus clearance, such as, by way of example, .125 inch to compensate for reduction in length by grinding or sharpening the saw during its useful life.

Commercial tests have conclusively proven that saws constructed in accordance with the teachings of the prevent invention have given up to 3 months continuous service without sharpening, truing or being removed from the sawing machine, as contrasted with other carbide tipped saws, the life of which have been from two hours to four days.

The structural details of my device are such as to insure a true running, clean cutting, non heating, thin saw which has effected material savings up to 50% in one application and material savings of $150.00 per day in another commercial installation. Diligent research has failed to disclose any commercial carbide tipped circular saw having a tip width of less than .125 inch; such saws when found were made in accordance with the teachings of the Langenbach Patent No. 1,842,789, dated January 26, 1932. Saws of this general class are characterized by their warpage and need for frequent "tensioning." Such saws are likewise subject to the inherent disadvantage of being distorted when being ground and during the process of permanently securing the hardened tips thereto.

The saw of the present invention, though considerably cheaper and more compact than the saw disclosed in the R. R. Roemer Patent No. 2,022,433, dated November 26, 1935, will nevertheless by reason of its construction do all those things claimed for the saw of this patent, and in addition thereto provide a considerably thinner cut.

From the foregoing, it will be noted that a circular saw made in accordance with the teachings of the present invention possesses many inherent advantages over devices presently in use. The heavy body portion 10 of my saw enables it to be easily clamped at practically any location on said body portion for securing the saw, without distortion, to the table of a grinder, thereby insuring an accurately ground, nonwarped disc which will not "run out." This is in sharp contrast to the condition encountered today with other circular saws which are characterized by certain inherent disadvantages which are particularly manifest when they are ground. During a grinding operation it becomes necessary to rigidly secure the saw body to the table of a grinder, and the manner in which the saw is thus clamped to the table greatly effects its operating characteristics; by way of example, if a saw is ground while supported on a 2-inch collet, the saw will not run true in those instances when it is faced with hub supports greater than two inches in diameter. Likewise, it will be noted that if a regular saw is ground while secured with a 2-inch collet, said saw will require regrinding even though it is not used, if it be later trued on the same or another grinding machine while held with a larger or smaller collet. Quite obviously, this condition has presented a serious problem to the industry requiring tedious, time consuming adjustments and frequent tensioning operations. Another disadvantage ever present in grinding present day saws is the warp or bending imparted to the saw by reason of being magnetically clamped to the grinder table. Quite frequently the saw, being thin, is flexed or distorted by the clamping forces.

The saw of the present invention avoids these disadvantages since the body portion 10 is of sufficient thickness to effectively resist any distortion which might otherwise be induced by the clamping means during the truing or grinding operation. Such a saw will run absolutely true and may be interchangeably used on various machines and operated at different speeds without requiring a separate tensioning operation for each machine and/or speed of operation, as is presently the case. In other words, my saw is truly interchangeable and is not made-to-order for a particular machine or for operation at a particular speed.

It is believed proper for a better understanding of the problem I have solved, if the steps followed in the manufacture of a circular saw, prior to my contribution to the art, be enumerated, to wit:

A blank of the desired size and thickness is secured after which teeth are punched or milled into the outer periphery. The blank is then heat treated and tensioned, after which it is surface ground to finish thickness. In many instances the blank is again tensioned or subjected to a straightening operation after which hardened tips are brazed or otherwise permanently secured to the teeth. The saw is again tensioned after which the teeth are sharpened. The saw must then be tensioned for satisfactory operation on a particular machine and for a certain predetermined speed of operation.

With my saw, it will be observed that after the teeth have been provided in the outer periphery of the fin which is formed integral with and in circumscribing relationship with the body, the blank is heat treated and any warpage or distortion which may occur in the fin or body may be completely removed by one grinding or truing operation. When the teeth are brazed in place, the body portion conducts the heat in such a manner as to effectively and positively preclude warpage or the inducing of undesirable stresses and strains in the body and fin, whereby the saw may be used after sharpening. No tensioning is required.

I have found that in those instances where the width dimension $a$ of the fin is .125 or greater, the overall width or thickness dimension of body portion 10 may approximate three times dimension $a$. However, in those instances wherein dimension $b$ is as narrow as .040, the thickness of body portion 10 may be as great as ten times that of dimension $a$.

From the foregoing, it will be observed that the thickness of fin varies from approximately 10% to 40% of the thickness of the body portion.

From the drawing and description it is apparent that the opposite axial faces of the body portion or disc 10 are substantially parallel, smooth, flat and even, and that the opposite face portions of fin 12 are likewise substantially parallel, smooth, flat and even, said face portions of the fin being not only parallel to each other but parallel with the axial faces of the disc 10.

It should be understood that various changes and modifications may be made within the scope of the appended claims without departing from the spirit of the invention.

What is claimed is:

1. The method of making a duplicatable circular saw having a thin cutting edge defined by teeth faced with hardened tips, which method comprises the steps of providing a substantially circular metallic disc of substantially uniform thickness, of forming a relatively thin circumferential fin by removing axial face portions from each side of said disc adjacent its periphery, thereby disposing the fin centrally of the periphery of the disc, of forming teeth in the peripheral portion only of the fin, with the notches of the teeth radially spaced outwardly of the juncture of the fin with the periphery of the disc, of grinding the opposite faces of the disc and the opposite face portions of the fin so that the face portions of the disc and the face portions of the fin are in substantial parallelism and smooth, flat and even, of brazing hardened cutting tips to each tooth and of then sharpening said tips, resulting in a fully completed circular saw which when in use and for all rotational speeds will for infinite periods of time maintain the parallel relationship of the axial faces of the disc and the fin.

2. The method of making a duplicatable circular saw having a thin cutting edge defined by teeth faced with hardened tips, which method comprises the steps of providing a substantially circular metallic disc of substantially uniform thickness, of forming a circumferential fin having a thickness of from 10% to 40% of the thickness of the disc by removing axial face portions from each side of said disc adjacent its periphery, thereby disposing the fin centrally of the periphery of the disc, of forming teeth in the peripheral portion only of the fin, with the notches of the teeth radially spaced outwardly of the juncture of the fin with the periphery of the disc, of grinding the opposite faces of the disc and the opposite face portions of the fin so that the face portions of the disc and the face portions of the fin are in substantial parallelism and smooth, flat and even, of brazing hardened cutting tips to each tooth and of then sharpening said tips, resulting in a fully completed circular saw which when in use and for all rotational speeds will for infinite periods of time maintain the parallel relationship of the axial faces of the disc and the fin.

3. The method of making a duplicatable circular saw having a thin cutting edge defined by teeth faced with hardened tips, which method comprises the steps of providing a substantially circular metallic disc of substantially uniform thickness, of forming a circumferential fin having a thickness dimension of from 10% to 40% of the thickness of the disc by removing axial face portions from each side of said disc adjacent its periphery, thereby disposing the fin centrally of the periphery of the disc, of forming teeth in the peripheral portion only of the fin, with the notches of the teeth radially spaced outwardly of the juncture of the fin with the periphery of the disc, of heat treating the disc and fin, of grinding the opposite faces of the disc and the opposite face portions of the fin so that the face portions of the disc and the face portions of the fin are in substantial parallelism and smooth, flat and even, of brazing hardened cutting tips to each tooth and of then sharpening said tips, resulting in a fully completed circular saw which when in use and for all rotational speeds will for infinite periods of time maintain the parallel relationship of the axial faces of the disc and the fin.

4. A duplicatable circular saw comprising a rigid disc having flat, smooth, even parallel opposite axial faces and an integral thin circumferential fin having flat, smooth, even parallel opposite faces extending outwardly medially of the periphery of the disc, said fin having a series of spaced teeth in a peripheral portion thereof and spaced radially outwardly of the portion of the fin at its juncture with the periphery of the disc wherein the axial faces of said disc and said fin will remain in parallelism for extended periods of time when the saw is stationary and for all rotational speeds when in use.

5. A duplicatable circular saw as defined in and by claim 4, wherein the teeth are provided with hardened cutting tips brazed in place.

6. A duplicatable circular saw comprising a rigid disc having flat, smooth, even, parallel opposite axial faces and an integral thin circumferential fin of a thickness of from 10% to 40% of the thickness of the disc and having flat, smooth, even, parallel opposite faces extending outwardly medially of the periphery of the disc, said fin having a series of spaced teeth in a peripheral portion thereof and spaced radially outwardly of the portion of the fin at its juncture with the periphery of the disc wherein the axial faces of said disc and said fin will remain in parallelism for extended periods of time when the saw is stationary and for all rotational speeds when in use.

7. A duplicatable circular saw as defined in and by claim 6 wherein the teeth are provided with hardened cutting tips brazed in place.

VERNON H. HILDEBRANT.

(References on following page)

REFERENCES CITED

The following references are of record in the file of this patent:

UNITED STATES PATENTS

| Number | Name | Date |
|---|---|---|
| 198,142 | Morreau | Dec. 11, 1877 |
| 1,837,344 | Stauder | Dec. 22, 1931 |
| 1,842,789 | Langenbach | Jan. 26, 1932 |
| 1,861,218 | Huther | May 31, 1932 |
| 2,318,549 | Wilkie | May 4, 1943 |
| 2,350,974 | Grayson | June 6, 1944 |
| 2,422,404 | Goehle | June 17, 1947 |

FOREIGN PATENTS

| Number | Country | Date |
|---|---|---|
| 537,764 | Great Britain | July 4, 1941 |

OTHER REFERENCES

"Manufacturing Circular Saws," Machinery, June 1930 (pages 793 to 797).

"The Application of Tungsten Carbide to Circular Saws," pages 681–682, Mechanical Engineering, July 1930.

Simonds "The Saw Makers," Catalogue No. 35, page 35.